United States Patent
Ke et al.

(10) Patent No.: US 7,663,284 B2
(45) Date of Patent: Feb. 16, 2010

(54) BOBBIN FOR STATOR OF MOTOR

(75) Inventors: Chau-Yuan Ke, Taipei Hsien (TW); Chia-Hung Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/170,782

(22) Filed: Jul. 10, 2008

(65) Prior Publication Data
US 2009/0278418 A1 Nov. 12, 2009

(30) Foreign Application Priority Data
May 6, 2008 (CN) .......................... 2008 1 0301422

(51) Int. Cl.
*H02K 1/00* (2006.01)
(52) U.S. Cl. .................................................. 310/194
(58) Field of Classification Search .............. 310/194, 310/214, 43
See application file for complete search history.

(56) References Cited
U.S. PATENT DOCUMENTS 1,481,190 A * 1/1924 Durbin et al. ............ 242/118.7
5,539,265 A * 7/1996 Harris et al. ................ 310/263
6,888,271 B2 * 5/2005 York .......................... 310/49 A
6,975,056 B2 * 12/2005 Okada et al. ................ 310/194

* cited by examiner

*Primary Examiner*—Nguyen N Hanh
(74) *Attorney, Agent, or Firm*—Andrew C. Cheng

(57) ABSTRACT

A bobbin includes a bobbin body, two top sidewalls, two bottom sidewalls, four top tabs and four bottom tabs. The bobbin body includes a top surface formed at one end of the bobbin body, a bottom surface formed at an opposite end of the bobbin body and a side surface located between the top surface and the bottom surface. The top sidewalls extend radially outward from the top surface of the bobbin body. The bottom sidewalls extend radially outward from the bottom surface of the bobbin body. The bottom sidewalls are staggered so that there is no overlap area between the top sidewall and the bottom sidewall along an axial direction of the bobbin body. Four top tabs extend away from the top surface at a position where there is no top sidewall. Four bottom tabs extend away from the bottom at a position where there is no bottom sidewall.

11 Claims, 4 Drawing Sheets

BOBBIN FOR STATOR OF MOTOR

BACKGROUND

1. Technical Field

The present invention generally relates to bobbins, and particularly to a bobbin used in an electromagnetic motor.

2. Description of Related Art

Electromagnetic motors are widely used in many industries. A bobbin is a critical component of an electromagnetic motor, so the design of the bobbin is very important.

Referring to FIG. 3, a typical bobbin 30 used in an electromagnetic motor (not shown) includes a rectangular bobbin body 31 and two sidewalls 33. The two sidewalls are formed at opposite ends (not shown) of the bobbin body, respectively. Each sidewall 33 protrudes radially outward to prevent wires (not shown) wound around the bobbin body 31 from sliding out. However, when the sidewalls 33 of the bobbin 30 are molded, additional side sliding blocks are required in the molds. Thus, the sidewalls 33 of the bobbin 30 cannot be molded in an up-down stripping manner, complicating the molding of the bobbin 30.

Referring to FIG. 4, another typical bobbin 40 includes a bobbin body 41 and two sidewalls 43. The bobbin 40 is similar to the bobbin 30 in FIG. 3 except that the sidewalls 43 protrude radially outward only at two opposite sides of the bobbin body 41. There is no overlap area between the sidewalls 43 at the top end of the bobbin body 41 and the sidewalls 43 at the bottom end of the bobbin body 41 along an axial direction of the bobbin body 41. This design enables the sidewalls 43 of the bobbin 40 to be molded in the up-down stripping manner. However, the wires wound around the bobbin body 41 may easily slide out from the bobbin body 41, where there are no sidewalls 43, and negatively affecting the quality of the bobbin 40.

Therefore, an improved bobbin which can be easily molded and prevent wires wound around the bobbin from sliding out is desired to overcome the above-described deficiencies.

SUMMARY

A bobbin includes a bobbin body, two top sidewalls, two bottom sidewalls, four top tabs and four bottom tabs. The bobbin body includes a top surface formed at one end of the bobbin body, a bottom surface formed at an opposite end of the bobbin body and a side surface located between the top surface and the bottom surface. The top sidewalls extend radially outward from the top surface of the bobbin body. The bottom sidewalls extend radially outward from the bottom surface of the bobbin body. The bottom sidewalls are staggered so that there is no overlap area between the top sidewall and the bottom sidewall along an axial direction of the bobbin body. Four top tabs extend away from the top surface at a position where there is no top sidewall. Four bottom tabs extend away from the bottom at a position where there is no bottom sidewall.

Other advantages and novel features of the present invention will become more apparent from the following detailed description when taken in conjunction with the accompanying drawings.

BRIEF DESCRIPTION OF THE DRAWINGS

Many aspects of the present bobbin can be better understood with reference to the following drawings. The components in the drawings are not necessarily drawn to scale, the emphasis instead being placed upon clearly illustrating the principles of the present bobbin. Moreover, in the drawings, like reference numerals designate corresponding parts throughout the several views.

DETAILED DESCRIPTION OF THE EMBODIMENTS

Figure 1:
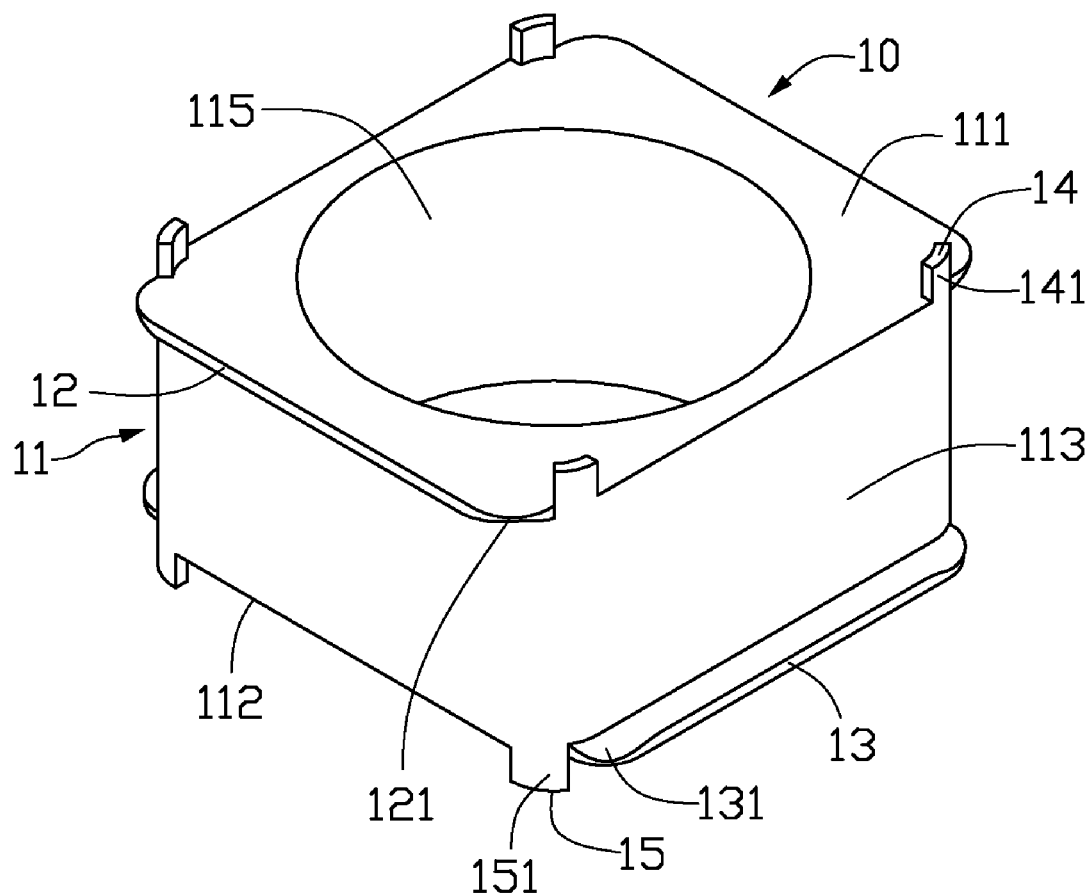
FIG. 1 is an isometric view of one embodiment of a bobbin.

Referring to FIG. 1, a bobbin 10 includes a bobbin body 11, two top sidewalls 12, two bottom sidewalls 13, a plurality of top tabs 14 and a plurality of bottom tabs 15.

The bobbin body 11 is column shaped, and includes a top surface 111, a bottom surface 112, and a side surface 113. The top surface 111 and the bottom surface 112 are respectively formed at two opposite ends of the bobbin body 11. The side surface 113 is located between the top surface 111 and the bottom surface 112. The side surface 113 has four rounded edges to prevent wires 18 (shown in FIG. 2) from being scraped when the wires 18 are wound around the side surface 113. The bobbin body 11 defines an axial hole 115 extending through the top surface 111 and the bottom surface 112.

The top sidewalls 12 extend radially outward from two opposite lateral sides of the top surface 111, respectively. The bottom sidewalls 12 extend radially outward from two opposite lateral sides of the bottom surface 111, respectively. The top sidewalls 12 are staggered from the bottom sidewalls 13 by ninety degrees so that there is no overlap area between the top sidewalls 12 and the bottom sidewalls 13 along an axial direction of the bobbin body 11. Two opposite ends (not labeled) of each top and bottom sidewall 12, 13 are arc-shaped. A thickness of each top sidewall 12 increases from each opposite end towards the interior of the top sidewall 12. A thickness of each bottom sidewall 13 increases from each opposite end towards the interior of the bottom sidewall 13. As a result, top inclined surfaces 121 and bottom inclined surfaces 131 are formed at opposite ends of each top and bottom sidewall 12, 13, respectively. The inclined surfaces 121, 131 of the top and bottom sidewalls 12, 13 allow the wires 18 to be easily wound between the top sidewalls 12 and the bottom sidewalls 13. In one embodiment, the top and bottom inclined surface 121, 131 is a smooth arcuate surface. In another embodiment, the inclined surface 121, 131 can be a planar surface.

The plurality of top tabs 14 extend away from the top surface 111 at positions (not labeled) where there are no top sidewalls 12. The plurality of bottom tabs 15 extend away from the bottom surface 112 at positions (not labeled) where there are no bottom sidewalls 113. The top and bottom tabs 14, 15 prevent the wires 18 wound around the side surface 13 from sliding out from the bobbin body 11 where there are no top and bottom sidewalls 12, 13. The top and bottom tabs 14, 15 can be molded during the molding of the sidewalls 12, 13 in an up-down stripping manner, simplifying the molding process of the bobbin 10.

In the illustrated embodiment, four top tabs 14 extend perpendicularly from the top surface 111 at two opposite lateral sides (not labeled) where there are no top sidewalls 12. Each lateral side of the top surface 111 forms two top tabs 14. The bottom tabs 15 extend perpendicularly from the bottom surface 112 at two opposite lateral sides (not labeled) where there are no bottom sidewalls 13. Each lateral side of the bottom surface 112 of the bobbin body 11 forms two bottom tabs 15. Each top and bottom tab 14, 15 is flake-shaped, and has a top outer surface 141 and a bottom outer surface 151, respectively, facing away from the axial hole 115. The top and bottom outer surfaces 141, 151 communicate with the side surface 113.

Figure 2:
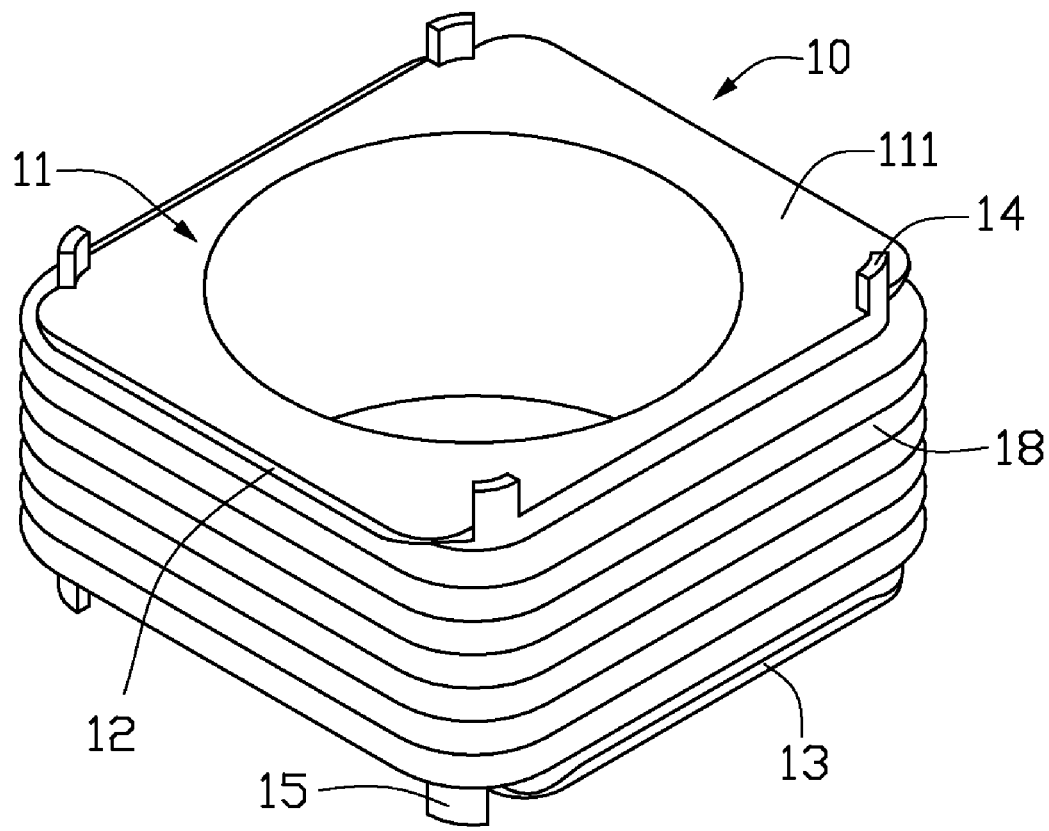
FIG. 2 is an isometric view showing wires wound around the bobbin of FIG. 1.
Figure 3:
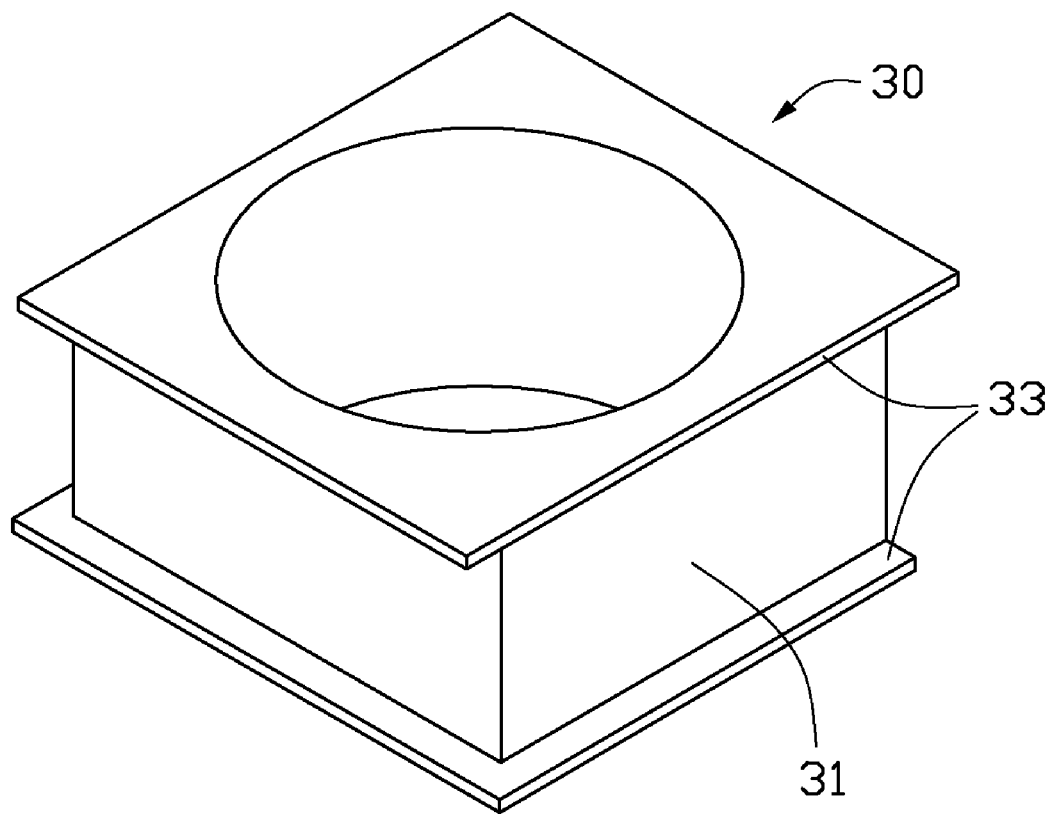
FIG. 3 is an isometric view of a typical bobbin.
Figure 4:
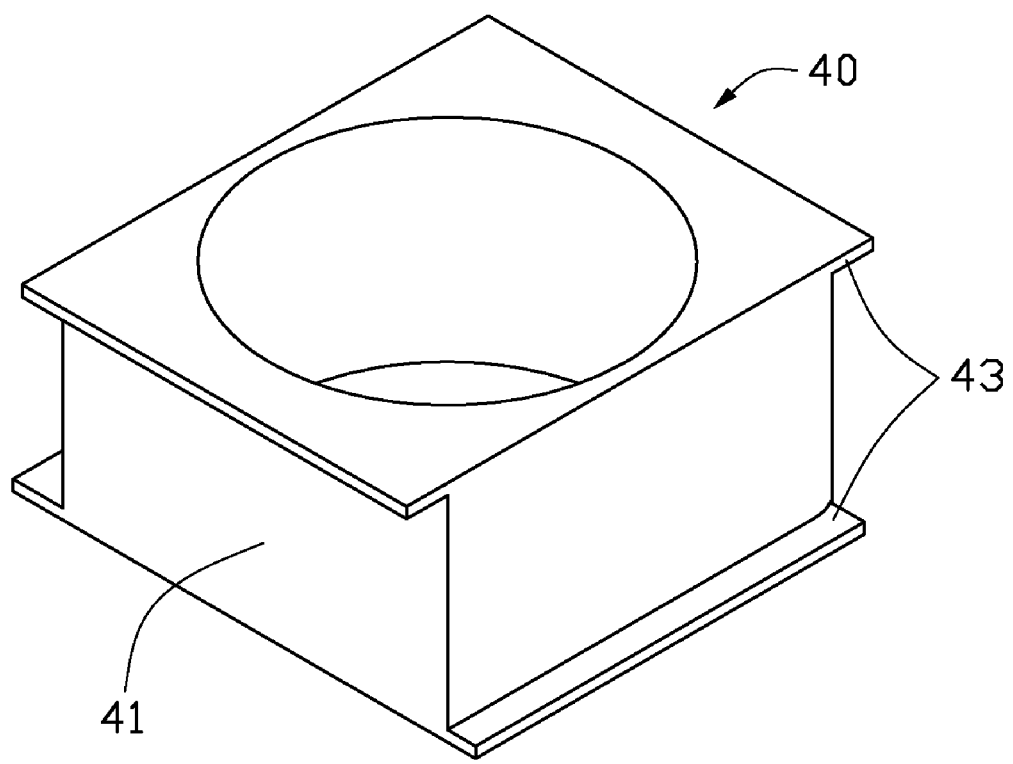
FIG. 4 is an isometric view of another typical bobbin.

Referring to FIG. 2, the wires 18 are wound around the side surface 113 of the bobbin body 11 and sandwiched between the top sidewalls 12 and the bottom sidewalls 13.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A bobbin comprising:
    a bobbin body comprising:
        a top surface formed at one end of the bobbin body;
        a bottom surface formed at an opposite end of the bobbin body; and
        a side surface located between the top surface and the bottom surface;
    two top sidewalls extending radially outward from the top surface of the bobbin body;
    two bottom sidewalls extending radially outward from the bottom surface of the bobbin body, wherein the top and bottom sidewalls are staggered so that there is no overlap area between the top sidewall and the bottom sidewall along an axial direction of the bobbin body;
    a plurality of top tabs extending away from the top surface, wherein each of the top sidewalls extends from a position of the top surface entirely between two adjacent tabs of the top tabs; and
    a plurality of bottom tabs extending away from the bottom surface, wherein each of the bottom sidewalls extends from a position of the bottom surface entirely between two adjacent tabs of the bottom tabs.

2. The bobbin of claim 1, wherein outer surfaces of the top and bottom tabs communicate with the side surface.

3. The bobbin of claim 1, wherein the thickness of the top and bottom sidewall increases from the ends of the top and bottom sidewall towards the center forming an inclined surface at each end of each top and bottom sidewall.

4. The bobbin of claim 3, wherein the inclined surface is one of a smooth arcuate surface and a planar surface.

5. The bobbin of claim 1, wherein each end of each top and bottom sidewall is arc-shaped.

6. The bobbin of claim 1, wherein a plurality of wires are wound around the side surface of the bobbin body.

7. The bobbin of claim 1, wherein the top and bottom tabs are flake-shaped.

8. The bobbin of claim 1, wherein the top and bottom sidewalls extend radially outward from two opposite lateral sides of the top and bottom surfaces, respectively.

9. The bobbin of claim 1, wherein four tops tabs extend perpendicularly from the top surface and four bottom tabs extend perpendicularly from the bottom surface.

10. The bobbin of claim 1, wherein the plurality of top tabs comprise a first top tab, a second top tab, a third top tab and a fourth top tab in sequence; one of the top sidewalls extends from a position of the top surface entirely between the first and second top tabs, the other one of the top sidewalls extends from a position of the top surface entirely between the third and fourth top tabs, such that no top sidewall extends from a position of the top surface between the first and fourth top tabs, or from a position of the top surface between the second and third top tabs.

11. The bobbin of claim 10, wherein the plurality of bottom tabs comprise a first bottom tab, a second bottom tab, a third bottom tab and a fourth bottom tab in sequence; one of the bottom sidewalls extends from a position of the bottom surface entirely between the first and fourth bottom tabs, the other one of the bottom sidewalls extends from a position of the bottom surface entirely between the second and third tabs, such that no bottom sidewall extends from a position of the bottom surface between the first and second bottom tabs, or from a position of the bottom surface between the third and fourth bottom tabs.

* * * * *